United States Patent
Gajek (10) Patent No.: US 10,938,547 B2
(45) Date of Patent: *Mar. 2, 2021

(54) METHOD AND SYSTEM FOR PROVIDING ENCRYPTED DATA

(71) Applicant: NEC CORPORATION, Tokyo (JP)

(72) Inventor: Sebastian Gajek, Flensburg (DE)

(73) Assignee: NEC CORPORATION, Tokyo (JP)

( * ) Notice: Subject to any disclaimer, the term of this patent is extended or adjusted under 35 U.S.C. 154(b) by 322 days.

This patent is subject to a terminal disclaimer.

(21) Appl. No.: 15/542,686

(22) PCT Filed: Jan. 12, 2015

(86) PCT No.: PCT/EP2015/050432
§ 371 (c)(1),
(2) Date: Jul. 11, 2017

(87) PCT Pub. No.: WO2016/112954
PCT Pub. Date: Jul. 21, 2016

(65) Prior Publication Data
US 2017/0366338 A1    Dec. 21, 2017

(51) Int. Cl.
*H04L 9/00*    (2006.01)
*H04L 9/08*    (2006.01)
(Continued)

(52) U.S. Cl.
CPC ............ *H04L 9/008* (2013.01); *H04L 9/3073* (2013.01); *H04L 2209/46* (2013.01)

(58) Field of Classification Search
CPC ........ H04L 9/14; H04L 9/0833; H04L 9/0822
See application file for complete search history.

(56) References Cited

U.S. PATENT DOCUMENTS 8,565,435 B2    10/2013 Gentry et al.
10,630,472 B2*   4/2020 Gajek ................... H04L 9/3073
(Continued)

OTHER PUBLICATIONS

B. Wang, M. Li, S. S. M. Chow and H. Li, "A tale of two clouds: Computing on data encrypted under multiple keys," 2014 IEEE Conference on Communications and Network Security, San Francisco, CA, 2014, pp. 337-345. (Year: 2014).*

(Continued)

*Primary Examiner* — Alexander Lagor
(74) *Attorney, Agent, or Firm* — Leydig, Voit & Mayer, Ltd.

(57) ABSTRACT

A method for providing encrypted data on a client, a cloud or the like includes, providing, for each user, a user-specific encryption key for encrypting user-specific plaintext. A common decryption key is computed with a pre-determined f netion using the user-specific encryption keys as input for the function, The function is a polysized function supporting poly-many additions and a single multiplication. Each user-specific plaintext is encrypted with the corresponding user-specific encryption key resulting in user-specific ciphertexts, The encrypting is performed such that encryption is homomorphic in the user-specific plaintext as well in the user-specific encryption keys. A. common ciphertext is computed with the function using the user-specific ciphertexts as input for the function. The common ciphertext and the common decryption key are provided for decryption.

14 Claims, 4 Drawing Sheets

(51) Int. Cl.
  *H04L 29/06* (2006.01)
  *H04L 9/14* (2006.01)
  *H04L 9/30* (2006.01)

(56) References Cited

U.S. PATENT DOCUMENTS

| | | | |
|---|---|---|---|
| 2007/0005958 A1* | 1/2007 | Hsu | H04L 63/0428 713/163 |
| 2013/0097417 A1 | 4/2013 | Lauter et al. | |
| 2013/0170640 A1 | 7/2013 | Gentry | |

OTHER PUBLICATIONS

Wang Boyang et al: "A tale of two clouds: Computing on data encrypted under multiple keys", 2014 IEEE Conference on Communications and Network Security, IEEE, Oct. 29, 2014 (Oct. 29, 2014), pp. 337-345, XP032714698.
Dan Boneh et al: "Evaluating 2-DNF Formulas on Ciphertexts", Feb. 10, 2005 (Feb. 10, 2005), Theory of Cryptography: Second Theory of Cryptography Conference, TCC 2005, Cambridge, MA, USA, Feb. 10-12, 2005; Proceedings; [Lecture Notes in Computer Science], Berlin [U.A.]: Springer, Berlin, Heidelberg, pp. 325-341, XP047029378.
Boneh, Dan et al. "Fully Key-Homomorphic Encryption, Arithmetic Circuit ABE and Compact Garbled Circuits," May 11, 2014, Eurocrypt 2014, p. 533-556, XP047472938.

* cited by examiner

METHOD AND SYSTEM FOR PROVIDING ENCRYPTED DATA

CROSS-REFERENCE TO PRIOR APPLICATION

This application is a U.S. National Stage Application under 35 U.S.C. § 371 of International Application No. PCT/EP2015/050432 filed on Jan. 12, 2015. The International Application was published in English on Jul. 21, 2016 as WO 2016/112954 A1 under PCT Article 21(2).

FIELD

The present invention relates to a method for providing encrypted data on a client, a cloud or the like.

The present invention further relates to a system for providing encrypted data, preferably in form of a client, a cloud or the like.

Although applicable to any kind of encryption system, the present invention will be described with regard to an encryption system located in a cloud.

BACKGROUND

Cloud storage and services enable a user to offload storage of their data and associated computations on that data. Therefore companies and enterprises may avoid an expensive data center of their own and rely instead on cloud storage and corresponding computational services. However, data in the "cloud" raises serious privacy concerns, since the data in the cloud is for example accessible by the cloud provider itself. The enterprises have therefore to rely on the trustworthiness of the cloud provider and its security measures to avoid any misuse of the data.

Many cloud storage users employ in consequence encryption on user data to preserve the data privacy. One of the problems is however, that computation on encrypted data is very difficult to be efficiently performed without decrypting the encrypted data.

In US 2013/0097417 A1 a so-called somewhat homomorphic encryption scheme is provided. Collected data is encrypted using the somewhat homomorphic encryption based on a data provider's private key. Afterwards the encrypted data is stored in a network-accessible storage. Then computations are performed on the encrypted data and the encrypted results from the computation are communicated to the data provider. The data. provider decrypts the results using the data provider's private key. These somewhat homomorphic encryption schemes or 1-leveled homomorphic encryption schemes are restricted in the number of ciphertext multiplication compositions or gates, i.e. the upper bound I for the number of multiplication gates is fixed in advance.

In contrast thereto fully-homomorphic encryption schemes—FHE—are encryption schemes supporting the homomorphic evaluation of any polysized function, which is described as an arithmetic circuit over poly-many additions and poly-many multiplication gates over encrypted data. However, fully-homomorphic evaluation is nowadays still a theoretic concept despite significant progress made recently.

Therefore, somewhat homomorphic encryption schemes are at present the schemes which can be practically used. Such partially homomorphic encryption systems are for example the El Carnal crypto system, the PaiHier and the Goldwasser-Micali encryption system. These schemes are somewhat homomorphic in message plaintext.

In the non-patent literature of Craig Gentry and Shai Halevi "Implementing gentry's fully-homomorphic encryption scheme", Cryptology ePrint Archive, Report 2010/520, 2010, <<http://eprint.iacr.org/>> shows an encryption scheme which is fully-homomorphic in the message plaintext. Variants of these encryption schemes being fully-homomorphic in the message plaintext are for example disclosed in U.S. Pat. No. 8,565,435 B2 or in US 2013/00170640 A1. Other variants which are based on the same mathematical structure, i.e. a lattice structure, are for example disclosed in the non-patent literature of Adriana Lopez-Alt, Eran Tromer and Vinod Vaikuntanathan "On-the-fly multiparty computation on the cloud via multikey fully homomorphic encryption", Cryptology ePrint Archive, Report 2013/094, 2013, <<http://eprint.iacr.org/>> which are additive homomorphic in the encryption key and fully-homomorphic in the message plaintext Another variant of the encryption scheme based on the mathematical structure lattice, are fbr example disclosed in the non-patent literature of Dan Boneh, Craig Gentry, Sergey Gorbunov, Shai Halevi, Valeria Nikolaenko, Gil Segev, Vinod Vaikuntanathan and Dhinakaran Vinayagamurthy "Fully key-homomorphic encryption, arithmetic circuit abe, and compact garbled circuits", Cryptology ePrint Archive, Report 2014/356, 2014, <<http://eprint.iacr.org/>>, which have been shown to be fully-homomorphic in the encryption key but not in the message plaintext. These lattice-based constructions require much randomness sampled from the Gaussian distribution. Sampling randomness in particular from the Gaussian distribution cannotbeeffectively computed on low-level devices. Moreover the key and ciphertext sizes are very long, typically by a factor of 400 of the field size.

When these fully homomorphic encryption schemes are performed on the cloud, there are several problems arising: In some applications, for example one wishes to realize a supply chain where the cloud decrypts the outcome of the evaluation or a fraction thereof, One wants to make sure that the cloud learns no information about the input of the parties. The aforementioned fully homomorphic encryption schemes are useless here, because by definition there exists a single decryption key only. However, a cloud in possession of the decryption key will not only decrypt the evaluated ciphertext but may also decrypt the encrypted inputs of the parties and therefore a great security problem arises.

Another problem is that in many applications some verification mechanism has to be added to ensure a correct computation of the function, otherwise the parties do not have any guarantee of a correct evaluation. When using the aforementioned fully-homomorphic encryption schemes there is no guarantee that the cloud indeed computed the expected function. For this reason computationally expensive proofs of computation to verify the correct computation of the function are usually added.

SUMMARY

In an embodiment, the present invention provides a method for providing encrypted data on a client, a cloud or the like. In a step a), a user-specific encryption key fur encrypting user-specific plaintext is provided for each user, in a step b), a common decryption key is computed with a pre-determined function using the user-specific encryption keys as input for the function, The function is a polysized function supporting poly-many additions and a single multiplication. In a step c), each user-specific plaintext is encrypted with the corresponding user-specific encryption key resulting in user-specific ciphertexts. The encrypting is performed such that encryption is homomorphic in the user-specific plaintext as well in the user-specific encryption keys. In a step d), a common ciphertext is computed with the function using the user-specific ciphertexts as input for the function, In a step e), the common ciphertext and the common decryption key are provided for decryption.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention, The features and advantages of various embodiments of the present invention will become apparent by reading the following detailed description with reference to the attached drawings which illustrate the following.

DETAILED DESCRIPTION

An aspect of the present invention provides a method and a system for providing encrypted data which can be easily and efficiently implemented while being fast.

Another aspect of the present invention provides a method and a system for providing encrypted data using shorter key and eiphertext sizes without neglecting or reducing the security.

Yet another aspect of the present invention provides a method and system for providing encrypted data with which an easy verification for the proof of computation is enabled.

According to an embodiment of the present invention, a method for providing encrypted data on a client, a cloud or the like comprises the steps of:
a) Providing for each user a user specific encryption key for encrypting user-specific plaintext,
b) Computing a common decryption key with a pre-determined function using the user specific encryption keys as input for said function,
c) Encrypting each user-specific plaintext with the corresponding user-specific encryption key resulting in user-specific ciphertexts,
d) Computing a common ciphertext with said function using the user-specific ciphertexts as input for said function,
e) Providing the common ciphertext and the common decryption key for decryption, preferably to a user, wherein step c) is performed such that encryption is homomorphic in the user-specific plaintext as well in the user-specific encryption keys and wherein said function is a polysized functicm supporting poly-many additions and a single multiplication.

In claim 12 a system for providing encrypted data preferably in form of a client, a cloud or the like, preferably for performing with a method according to one of the claims 1-11, is defined.

According to another embodiment of the present invention, a system for providing encrypted data preferably in form of a client, a cloud or the like, preferably for performing with a method according to an embodiment of the present invention comprises: User key provision means adapted to provide for each user a user specific encryption key for encryption of user-specific plaintext, Decryption key generation means adapted to compute a common decryption key with a pre-determined fiinction using the user specific encryption keys as input for said function, Encryption means adapted to encrypt each user-specific plaintext with the corresponding user-specific encryption key resulting in user-specific ciphertexts, Ciphertext means adapted to compute a common ciphertext with said function using the user-specific ciphertexts as input for said function, and preferably Decryption means adapted to provide the common ciphertext and the common decryption key for decryption, preferably to a. user, wherein the encryption by the encryption means is performed such that encryption is homomorphic in the user-specific plaintext as well in the user-specific encryption keys and wherein said function is a polysized function supporting poly-many additions and a single multiplication.

The inventor has recognized, as part of the present invention, that the present invention is both homomorphic in the encryption key and in the message plaintext.

The inventor has further recognized, as part of the present invention, that an evaluation of level 1 circuits/functions supporting a single multiplication and poly-many additions is enabled. This circuit enables the evaluation of Boolean circuits, i.e. formulas comprising of "and"- and "or"- operations.

The inventor has even further recognized, as part of the present invention, that the present invention can be efficiently and easily implemented.

The inventor has even further recognized, as part of the present invention, that the sizes of the encryption keys as well as of the ciphertexts may be shorter compared with conventional methods and systems and require less randomness without reducing the security.

The term "homomorphic in the message plaintext" is to be understood in particular in the following way: If for any public key k and messages $(m_1, m_2)$ it holds that $Enc(k, m_1)$ $Enc(k, m_2) = Enc(k, m_1 \cdot m_2)$, where the operator "" is a operand allowing to "add" or "multiply" the message plaintext and Enc( )is an encryption procedure or routine.

The term "homomorphic in the key" or "homomorphic in the encryption key" or similar expressions are to be understood in the following way: A public-key encryption scheme is deemed homomorphic in the encryption key, if in addition for any pair of encryption keys $(k_1, k_2)$ and message plaintexts $(m_1, m_2)$ it holds that $Enc(k_1, m_2)$ $Enc(k_2, m_2) = Enc(k_1 \cdot k_2, m_1 \cdot m_2)$.

The term "compact" in connection with encryption key or ciphertext means that the ciphertext (resp. encryption key) size after the homomorphic-evaluation of ciphertexts (resp. encryption keys) does not increase as a function of the circuit.

According to a preferred embodiment a user applies for a common decryption key to decrypt the common ciphertext. This enables each user to perform decryption of the common ciphertext.

According to a further preferred embodiment if a key other in the common decryption key for decrypting the common ciphertext is used, a random value is provided as decryption result. When applying the "right" decryption key for the common ciphertext evaluated under the function, then the correctness of the performed steps guarantees that the user will decrypt $f(m_1, \ldots m_2) \leftarrow DEC(K, C)$. On the other hand security is safeguarded such that a curious or malicious party holding a key other than the common decryption key will decrypt a random value with overwhelming probability. In particular when applying the "right" encoding to a user-specific plaintext, e.g. by encoding the first half with "1"'s, each user can verify the correct computation of the function in question, An evaluation of the function other than said function decrypts to a message which is uniformly distributed. Even when a group of n−1 malicious or corrupted users combine their user-specific encryption keys these users are not able to decrypt the common ciphertext as long as a single user is honest or uncorrupted respectively.

According to a further preferred embodiment prior to computing the common decryption key a master secret key is generated which is used together with said function and said user-specific encryption keys to compute said common decryption key. A master secret key enables in an easy way to provide the further common decryption key, for example based on the function and the corresponding user-specific encryption keys.

According to a further preferred embodiment a master secret key is computed based on a group comprising at least three mutual orthogonal subgroups. This enables for example that the first subgroup encodes the randomness to satisfy semantic security, the second subgroup carries a random encoding of a tag and the third subgroup carries the message. The common decryption key then preferably comprises two components wherein the first cancels out the random terms and the second encodes the relation of the tags under the admissible evaluation of the function such that the element in the group carrying the random encoding of the tag cancels out only if the evaluation of the ciphertext has been performed according to the function. The ciphertext terms in the group carrying the random encoding of the tag when homomorphically evaluated comply with the function. Therefore ciphertext can be multiplied and added such that addition and multiplication holds to addition and multiplication of elements in the same subgroups. No element from a different subgroup distorts the operation. Thus an efficiently key and message homomorphism is provided.

According to a further preferred embodiment said subgroups are of the order of distinct primes and the order of said group is the product of the order of said subgroups. This enables an efficient implementation as well as providing a high level of security.

According to a further preferred embodiment when a user-specific encryption key is evaluated under said function, the resulting evaluated user-specific encryption key is compact is size. This enables that any homomorphic key evaluation of the level-one circuit results in constant key sizes of two group elements.

According to a further preferred embodiment when the user-specific ciphertext is evaluated under said function, the resulting evaluated user-specific, ciphertext is compact in size. This enables that any homomorphic ciphertext evaluation of the level-1 circuit results in constant ciphertext sizes of two group elements.

According to a further preferred embodiment the master secret key comprises random seed information associated with identification information via a pseudorandom function defining elements in different user-specific ciphertexts. This enables to reduce the size of the master secret key, for example by deriving tags through a pseudorandom function, Thus, storage space is saved.

According to a further preferred embodiment said function is provided out of the set of polysized affine functions. This enables an efficient computation of the function when being selected as a polysized affine function, FIG. 1 shows a part of a method according to a first embodiment of the present invention.

Figure 1:
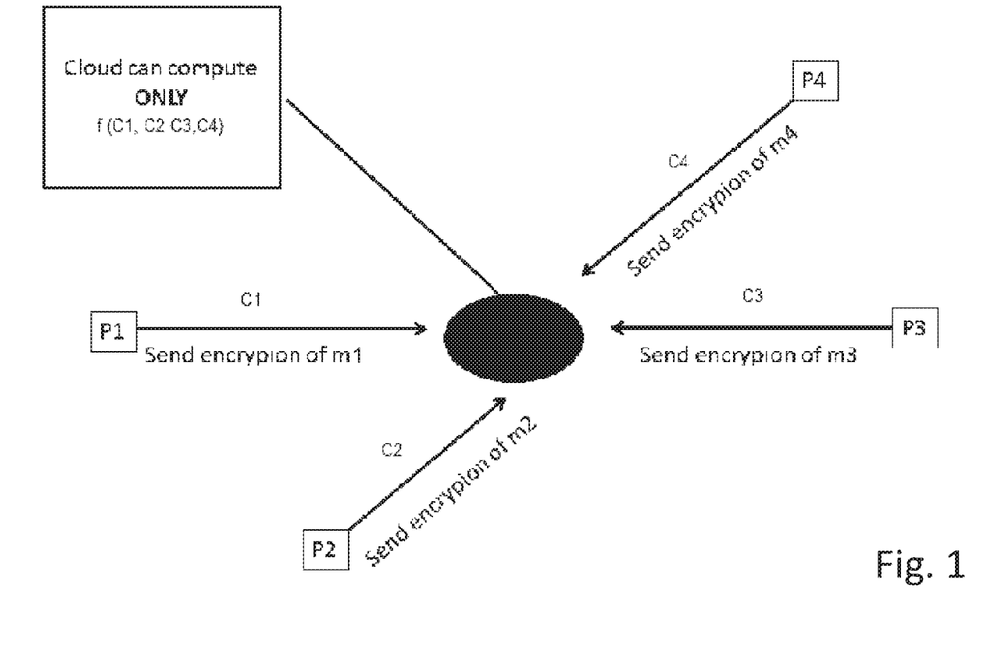
FIG. 1 shows a part of a method according to a first embodiment of the present invention.

In FIG. 1 an example scenario for a method according to an embodiment of the present invention is shown. Different users P1, P2, P3, P4 each use their own user-specific encryption key $k_1$, $k_2$, $k_3$, $k_4$, to encrypt the user-specific plaintext $m_1$, $m_2$, $m_3$, $m_4$. Each user P1, P2, P3, P4 sends the encryption of its user-specific plaintext $m_1$, $m_2$, $m_3$, $m_4$, i.e. the corresponding ciphertext C1, C2, C3, C4 to the cloud, so that the cloud receives the encryptions of the messages $m_1$, $m_2$, $m_3$, $m_4$ encrypted under the corresponding keys $k_1$, $k_2$, $k_3$, $k_4$. The cloud evaluates then not only the encrypted function f but also may decrypt the output f (C1, C2, C3, C4) provided if it is in-possession of the specific key, i.e. the common decryption key K =f ($k_1$, . . . $k_n$). This common decryption key K is useless for other operations than the decryption of the output f (C1, C2, C3, C4), Vice versa other keys other than f ($k_1$, . . . $k_n$) are useless of the decryption of f (C1, C2, C3, C4).

Figure 2:
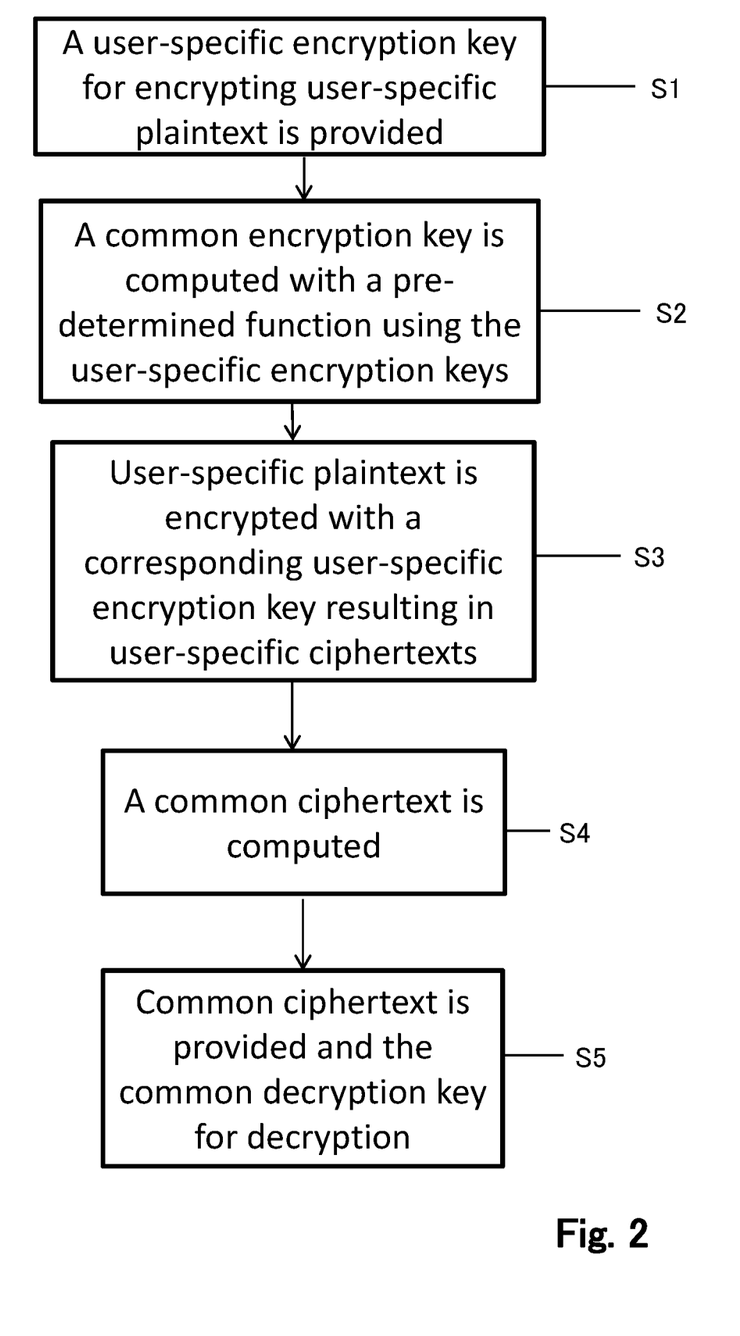
FIG. 2 shows steps of a method according to a second embodiment of the present invention.

FIG. 2 shows steps of a method according to a second embodiment of the present invention.

In FIG. 2 steps of a method according to a second embodiment is shown.

In a first step S1 for each user a user-specific encryption key for encrypting user-specific plaintext is provided, In a second step S2 a common encryption key is computed with a pre-determined function using the user-specific encryption keys as input for said function, In a third step S3 each user-specific plaintext is encrypted with a corresponding user-specific encryption key resulting in user-specific ciphertexts.

In a fourth step S4 a common ciphertext is computed with said function using the user-specific ciphertexts as input for said function and in a fifth step S5 the common ciphertext is provided and the common decryption key for decryption, preferably to a user.

The third step S3 is performed such that the encryption is homomorphic in the user-specific plaintext as well as in the user-specific, encryption keys and said function is a polysized function supporting poly-many additions and a single multiplication.

Figure 3:
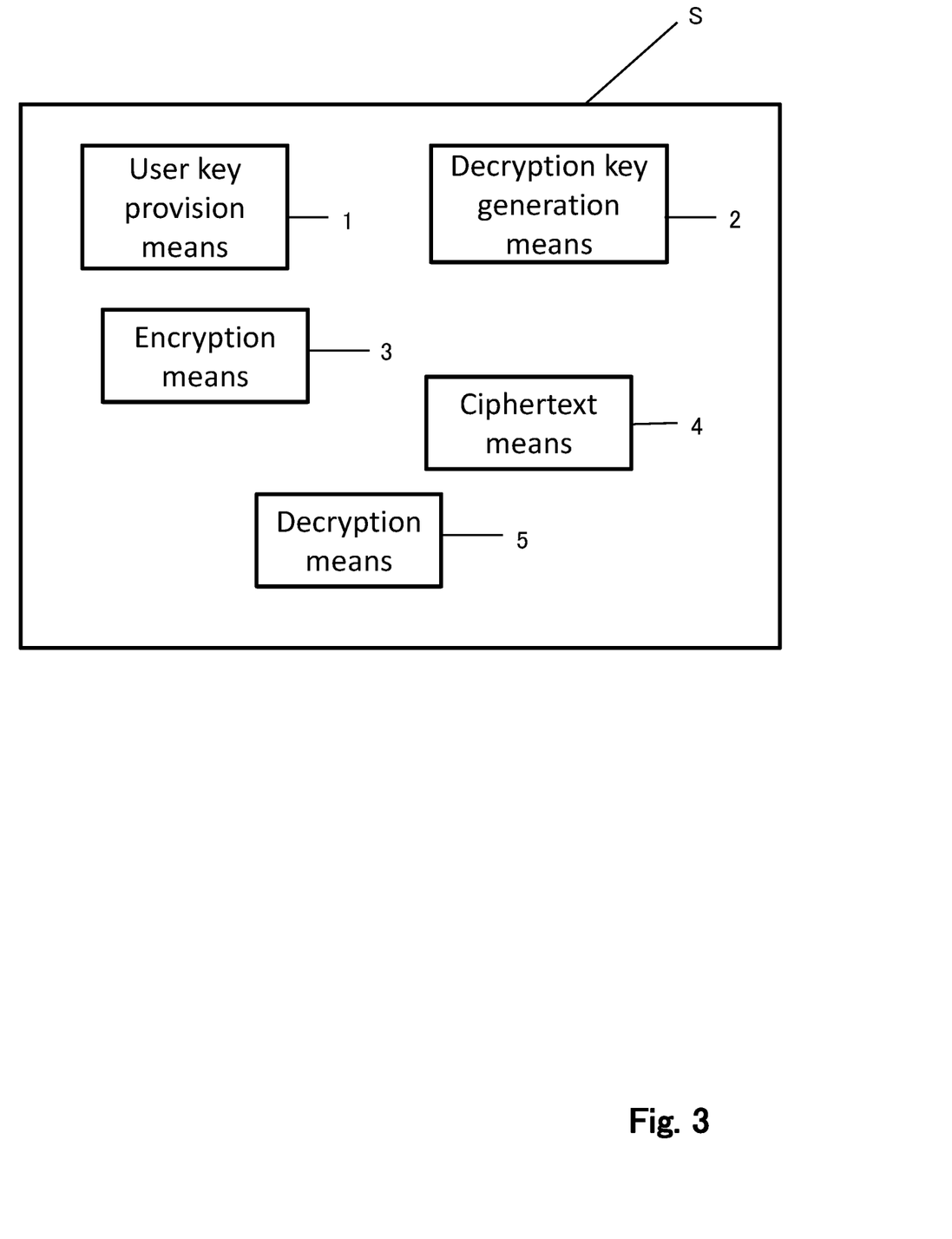
FIG. 3 shows a system according to a third embodiment of the present invention.

FIG. 3 shows a system according to a third embodiment of the present invention.

In FIG. 3 the system S comprises user key provision means 1 adapted to provide for each user a user-specific encryption key for encryption of user-specific plaintext.

The system S further comprises decryption key generation means 2 adapted to compute common encryption key with a pre-determined function using the user-specific encryption keys as input for said function.

The system S further comprises encryption means 3 adapted to encrypt each user specific plaintext with the corresponding user-specific and encryption key resulting in user-specific ciphertexts.

The system S even further comprises ciphertext means 4 adapted to compute a common ciphertext with said function using the user-specific ciphertexts as input for said. function and preferably decryption means 5 adapted to provide the common ciphertext and the common decryption key for decryption, preferably to a user, wherein the encryption by the encryption means 3 is performed such that the encryption is homomorphic in the user-specific plaintext as well as in the user-specific encryption key and wherein said function is a polysized function supporting poly-many additions and a single multiplication.

Figure 4:
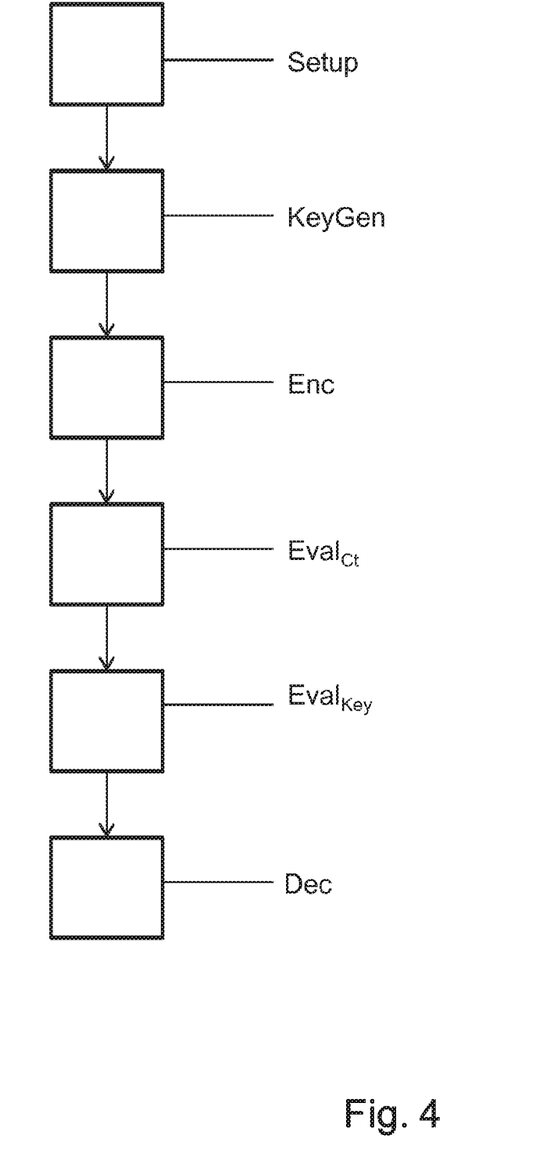
FIG. 4 shows a method according to a fourth embodiment of the present invention.

FIG. 4 shows a method according to a fourth embodiment of the present invention, In FIG. 4 steps of a construction of a level-1 key in message homomorphic symmetric encryption system are shown, In a first step a setup-procedure Setup(.) is performed:
Setup($I^\lambda$):

On input the security parameter $I^\lambda$, $\alpha$, $\beta \leftarrow \mathbb{Z}_N$ is chosen at random and $$(p, q, r, G, G_T, e) \leftarrow GG(I^{80})$$

is computed.

Set $g_p = g^{qr}$, $h_p = g^\alpha{}_p$, $g_q = g^{pr}$, $h_q = g^\beta{}_q$, $g_r = g^{pq}$ and $N = pqr$. Let $X = GG_{r,T}$ be the subgroup generated by $e(g_r, g_r)$. Let $K = Z_N \times Z_N$ be a set of index pairs. Let $T = Z_N \times Z_N$ be a set of tag pairs. It is assumed that every index $k = (i, j)$ being an element of K is associated with a random pair of tags $(t_{i,0}, t_{i,j})$ being an element of T, whose purpose is to identify the $i^{th}$ sequence of n ciphertexts, where j denotes the $j^{th}$ element. n is preferably assumed to be even such that $I = \text{ceil}(n/2)$, wherein cell(.) is the ceiling function giving the smallest integer greater than or equal to the input value.

The procedure outputs the master key pair $$MSK = p, q, r, \alpha, \beta, T \text{ and } PP = X, K$$

The size of the master secret key can be reduced by deriving the tags $(t_{i,0}, t_{i,j})$ through a pseudorandom function.

In a second step a Key Generation procedure KeyGen(.) is performed:

KeyGen (MSK, f, $k = (k_1, \ldots k_n)$): The first half of k is denoted as the tuple $((i, 1), \ldots, (i, 1))$ and the second half is denoted as $((i', 1), \ldots, (i', 1))$.

The secret key $SK_{f,k} = \alpha^2 * t_{i,0} * t_{i,0}, h_q^{\Sigma j\, t}{}_{i,j} * t'{}_{i,j}$ is returned.

If the function f is preferably the unary identity function, then the pair $$SK_{k,i,j} = (\alpha * t_{i,0}, h_q^{t}{}_{i,j})$$

is returned.

In a third step an encryption procedure Enc(.) for the message plaintext is performed: Enc ($SK_{kij}$, m)

To encrypt a message vector $m \in X$, choose random value $s \leftarrow_R Z_N$ and set the ciphertext $CT_{i,j}$ as $$A = g_p^s, B = h_p^t{}_{i,0} * s * h_q^t{}_{i,j} * g_r^m$$

In a fourth step an evaluation of the ciphertext is performed $Eval_{Ct}(f, CT_{i,1}, \ldots, CT_{i,n})$:

To evaluate the function f on a tuple of n ciphertexts $(CT_{i,1}, \ldots, CT_{i,n})$, the first half is denoted as $(CT_{i,1}, \ldots, CT_{i,1})$ and the second half is denot4ed as $(CT_{i'}, 1, \ldots, CT_{i', 1})$. The evaluation procedure parses for every ciphertext pair $(CT_{i,j}, CT_{i',j'})$ as $(A_{i,j}, B_{i,j}, A_{i',j'}, B_{i',j'})$ and completes the addition and multiplication operations as follows:

Multiplication: The procedure computes the component-wise bilinear map $$e(A_{i,j}, A_{i',j'}), e(B_{i,j}, B_{i',j'}) = e(g_p, g_p)^{si,j * si',j'},$$

$$e(h_p, h_p)^{ti,0*(si,j*si',j')} * e(h_q, h_q)^{ti,j*ti',j'} * e(g_r, g_r)^{mi,j*mi',j'} =$$

$$e(g_p, g_p)^{s^*}$$

$$e(h_p, h_p)^{t^*0^*s^*} * e(h_q, h_q)^{t^*1} * e(g_r, g_r)^{m^*} = A^*, B^*$$

and returns the ciphertext $CT = (A^*, B^*)$.

Addition (after Multiplication): The procedure computes the component-wise product $$A_1^* * A_2^*, B_1^* * B_2^* = e(g_p, g_p)^{si,j+si',j'},$$

$$e(h_p, h_p)^{t^*0,1^*(s^*1+s^*2)} * e(h_q, h_q)^{t^*1,1 + t^*1,2} * e(g_r, g_r)^{m^*1+m^*2} =$$

$$e(g_p, g_p)^{s+},$$

$$e(h_p, h_p)^{t^*0^*s+} * e(h_q, h_q)^{t+1} * e(g_r, g_r)^{m+} = A^+, B^+$$

and returns the ciphertext $CT = (A^+, B^+)$.

Addition (after Addition): The procedure one more time computes then the component-wise product $$A_1^+ * A_2^+, B_1^+ * B_2^+ = e(g_p, g_p)^{s+1+s+2},$$

$$e(h_p, h_p)^{t+0^*(s+1+s+2)} * e(h_q, h_q)^{t+1+t+2} * e(g_r, g_r)^{m+1+m+2} = e(g_p, g_p)^{s++},$$

$$e(h_p, h_p)^{t+0^*s++} * e(h_q, h_q)^{t+1++} * e(g_r, g_r)^{m++} = A^{++}, B^{++}$$

and returns the ciphertext $CT = (A^{++}, B^{++})$.

In a fifth step an evaluation procedure of the encryption keys is performed EvalKey(f, $SK_{ki,1}, \ldots, SK_{ki,n}$): To evaluate the function f on a triple of n keys ($SK_{ki,1}, \ldots, SK_{ki,n}$), the first half is denoted as ($SK_{ki,l}, \ldots, SK_{ki,1}$) and the second half as ($SK_{ki',1}, \ldots, SK_{ki,1}$).

The procedure parses for every key pair ($SK_{ki,j}, SK_{ki'j'}$) as $(A_{i,j}, B_{i,j}, A_{i'j'}, B_{i',j'})$ and computes the addition and multiplication operation as follows:

MultiplicationGate: The procedure computes $$A_{i,j} * A_{i',j'}, e(B_{i,j}, B_{i',j'}) = \alpha^2 t_{i,0} * t_{i',0},$$

$$e(h_p, h_p)^{ti,j*ti',j'} = A^*, B^*$$

and returns the key $SK = (A^*, B^*)$.

Addition (after Multiplication):

The procedure aborts if $A^*_1$ is not equal to $A^*_2$. Otherwise, it computes $$B^*_1 * B^*_2 = e(h_p, h_p)^{t^*1+t^*2}$$

and returns the key $SK = (A^*_1, B^{-1})$.

Addition (after Addition): Identical to addition (after multiplication). In a sixth step a decryption procedure is performed:

Dec(SK, CT): To decrypt a ciphertext $CT = (CT_1, CT_2)$ with secret key $SK = (A, B)$, compute $CT_2 / (CT_1^A * B)$.

and then return 0 if the output equals $e(g_r, g_r)^0 = 1$, and 1 otherwise.

A basis preferably for the method which steps are shown in FIG. 4 is the following:

Let G be a procedure that takes as input a security parameter $1^\lambda$ and outputs a tuple (p, q, r, G, $G_T$, e) where p, q, r are distinct primes, G and $G_T$ are two cyclic groups of order $N = pqr$, and e: $G \times G \to G_T$ is a non-degenerate bilinear map. That means that for all u, v being an element of G and for all a, b being an element of Z $$e(u^a, v^b) = e(u, v)^{ab},$$

and if g is a generator of G, then e(g, g) generates $G_T$. The bilinear map as well as multiplication in C is preferably efficiently computable. When not made explicit, the generators g and e (g, g) are part of the group descriptions G and $G_T$.

$G_p$, $G_q$ and $G_r$ denote the subgroups of G having order p, q, and r, respectively such that $G = G_p \times G_q \times G_r$. If g generates G, then $g_p=g^{qr}$ is a generator of $G_p$; $g_q=g^{pr}$ is a generator of $G_q$; $g_r=g^{pq}$ is a generator of $G_r$. Elements from distinct subgroups $G_p$, $G_q$, $G_r$ are orthogonal under the bilinear map, i.e. for $h_p$ being an element of $G_p$, and $h_q$ being an element of $G_q$ the following equation is satisfied $$e(h_p, h_q)=e((g^{qr})^\alpha)=e(g^\alpha, g^{62})^{pqr}=1$$

where $\alpha=\log_{gp}(h_p)$ and $\beta=\log_{gq}(h_q)$. The orthogonality of bilinear maps in composite groups gives a mechanism to multiply in subgroups, i.e. for $h_{p,i}$ being an element of $G_p$, $h_{q,j}$ being an element of $G_q$ and i being an element of $\{1, 2\}$:

$$e(h_{p,1} * h_{q,1}, h_{p,2} * h_{q,2}) = e((g^{qr})^{\alpha 1},$$
$$(g^{qr})^{\alpha 2}) * e((g^{qr})^{\alpha 1}, (g^{pr})^{\beta 2}) * e((g^{pr})^{\beta 1},$$
$$(g^{qr})^{\alpha 2}) * e((g^{pr})^{\beta 1}, (g^{pr})^{\beta 2}) = e(g_p, g_p)^{\alpha 1*\alpha 2} * e(g_q, g_q)^{\beta 1 \cdot \beta 2}$$

where $\alpha_i = \log_{gp}(h_{p,i})$ and $\beta_i = \log_{gq}(h_{q,i})$.

In summary the present invention enables efficiently a key and message homomorphism in pairing-friendly groups, In particular the present invention uses groups of prime order N where N is a composite of three primes p, q and r.

Ciphertexts according to the present invention are of the form $G_p \times G$ where $G_g = G_p \times G_q \times G_r$ such that subgroup $G_p$ encodes the randomness to satisfy semantic security, $G_q$ carries a random encoding of the tag, and $G_r$ the message. The decryption key comprises two components. The first cancels out the random terms in $G_p$, the second encodes the relation of tags under the admissible evaluation function f such that the element in $G_q$ cancels out, only if the evaluation of ciphertexts has been performed according to f. Ciphertexts terms in $G_q$, when homomorphically evaluated, comply with f.

In other words, the present invention enables to multiply and add ciphertexts such that addition and multiplication holds to addition and multiplication of elements in the same subgroups. No element from a different subgroup distorts the operation.

The present invention provides in particular the fallowing advantages:

It is both homomorphic in key and message plaintext.

It supports the evaluation of level-1 circuits supporting a single multiplication and poly-many additions, This circuit already allows the evaluation of Boolean circuits (meaning formulas consisting of "AND" and "OR" operations).

It is efficient, The present invention works over pairing-friendly groups G of composite order N. Thus, it can be preferably efficiently implemented over elliptic curves. Ciphertexts are two group elements in G. The secret key $SK_f$ for a circuit f consists of two elements in $G \times Z_N$.

It has compact ciphertexts. Any homomorphic ciphertext evaluation of the level-1 circuit results in constant ciphertext sizes of two group elements in $G_T \times G_T$ (where $G_T$ is the target group of the pairing).

It has compact keys. Any homomorphic key evaluation of the level-1 circuit results in constant keys sizes of two group elements in $Z_N \times G_T$.

Inter alia the present invention has several advantages apart from being both homomorphic in key and message:

1. It is fairly easy to implement as the underlying structure of the present invention is preferably a reminiscence of the El-Carnal encryption scheme, 2. It can be efficiently implemented in bilinear groups (on elliptic curves) for which fast implementations are known.

3. The key and ciphertext sizes are short. The sizes can be further reduced with the framework of Gottfried Herold, Julia Hesse, Dennis Hotheinz, Carla Rthis, and Andy Rupp. Polynomial spaces: A new framework for composite-to-prime-order transformations. Cryptology ePrint Archive, Report 2014/445, 2014. The order of composites to primes can be further reduced. The sizes are preferably squeezed with a method shown in said non-patent literature.

4. The present invention requires less randomness, Moreover, it suffices to sample from the uniform distribution for which efficient implementations exists, Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. R will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended, Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, erg,, A, any subset from the listed elements, e.g., A and B, or the entire list of elements A, B and C.

The invention claimed is:

1. A method for encrypting data, the method comprising:
providing, by a server, a user-specific encryption key for encrypting user-specific plaintext, to each of a plurality of users;
computing, by the server, a common decryption key with a pre-determined function using the user-specific encryption keys as input for the function, the function comprises a plurality of additions and a single multiplication;

receiving, by the server, encrypted user-specific ciphertext, wherein the user specific plaintext is encrypted with the corresponding user-specific encryption key resulting in the user-specific ciphertexts, the encrypting being performed by each user such that encryption is homomorphic in the user-specific plaintext as well in the user-specific encryption keys;

computing, by the server, a common ciphertext with the function using the user-specific ciphertexts as input for the function; and providing, by the server to each of the plurality of users, the common ciphertext and the common decryption key for decryption of the common ciphertext.

2. The method according to claim 1, wherein at least one user applies the common decryption key to decrypt the common ciphertext.

3. The method according to claim 1, further comprising providing a random value as a decryption result based on a key other than the common decryption key for decrypting the common ciphertext being used.

4. The method according to claim 1, wherein, prior to computing the common decryption key, a master secret key is generated which is used together with the function and the user-specific encryption keys to compute the common decryption key.

5. The method according to claim 4, wherein the master secret key is computed based on a group comprising at least three mutual orthogonal subgroups.

6. The method according to claim 5, wherein the subgroups are of an order of distinct primes and an order of the group is a product of the orders of the subgroups.

7. The method according to claim 5, wherein the master secret key comprises random seed information associated with identification information via a pseudorandom function defining elements in different user-specific ciphertexts.

8. The method according to claim 1, further comprising evaluating one of the user-specific encryption keys under the function such that a resulting evaluated user-specific encryption key is compact in size.

9. The method according to claim 1, further comprising evaluating the user-specific ciphertext under the function such that a resulting evaluated user-specific ciphertext is compact in size.

10. The method according to claim 1, wherein the function is provided out of a set of polysized affine functions.

11. The method according to claim 1, wherein the computing of the common decryption key includes dividing an input vector comprising the user-specific encryption keys into two parts, each part having the same length and indicating different user-specific ciphertexts.

12. The computer readable medium according to claim 1, wherein at least one user applies the common decryption key to decrypt the common ciphertext.

13. A system for providing encrypted data, the system comprising one or more computer processors and a non-transitory memory storing instructions, that when executed by the one or more computer processors, cause the system to perform the following steps:

providing, by a server, a user-specific encryption key for encrypting user-specific plaintext, to each of a plurality of users;

computing, by the server, a common decryption key with a pre-determined function using the user-specific encryption keys as input for the function, the function comprises a plurality of additions and a single multiplication;

receiving, by the server, encrypted user-specific ciphertext, wherein the user specific plaintext is encrypted with the corresponding user-specific encryption key resulting in user-specific ciphertexts, the encrypting being performed by each user_such that encryption is homomorphic in the user-specific plaintext as well in the user-specific encryption keys;

computing, by the server, a common ciphertext with the function using the user-specific ciphertexts as input for the function; and providing, by the server to each of the plurality of users, the common ciphertext and the common decryption key for decryption of the common ciphertext.

14. A non-transitory computer readable medium storing instructions, that when executed by a processor perform a method comprising:

providing, by a server, a user-specific encryption key for encrypting user-specific plaintext, to each of a plurality of users;

computing, by the server, a common decryption key with a pre-determined function using the user-specific encryption keys as input for the function, the function comprises a plurality of additions and a single multiplication;

receiving, by the server, encrypted user-specific ciphertext, wherein the user specific plaintext is encrypted with the corresponding user-specific encryption key resulting in user-specific ciphertexts, the encrypting being performed by each user such that encryption is homomorphic in the user-specific plaintext as well in the user-specific encryption keys;

computing, by the server, a common ciphertext with the function using the user-specific ciphertexts as input for the function; and providing, by the server to each of the plurality of users, the common ciphertext and the common decryption key for decryption of the common ciphertext.

* * * * *